(12) United States Patent
Bakulin et al.

(10) Patent No.: US 8,275,551 B2
(45) Date of Patent: *Sep. 25, 2012

(54) METHOD OF IMAGING OF SEISMIC DATA INVOLVING A VIRTUAL SOURCE, METHODS OF PRODUCING A HYDROCARBON FLUID, AND A COMPUTER READABLE MEDIUM

(75) Inventors: Andrey Victorovich Bakulin, Houston, TX (US); Kurang Jvalant Mehta, Houston, TX (US)

(73) Assignee: Shell Oil Company, Houston, TX (US)

( * ) Notice: Subject to any disclaimer, the term of this patent is extended or adjusted under 35 U.S.C. 154(b) by 276 days.

This patent is subject to a terminal disclaimer.

(21) Appl. No.: 12/515,650

(22) PCT Filed: Nov. 16, 2007

(86) PCT No.: PCT/US2007/084915
§ 371 (c)(1),
(2), (4) Date: Jan. 28, 2010

(87) PCT Pub. No.: WO2008/064100
PCT Pub. Date: May 29, 2008

(65) Prior Publication Data
US 2010/0139927 A1    Jun. 10, 2010

Related U.S. Application Data

(60) Provisional application No. 60/866,950, filed on Nov. 22, 2006.

(51) Int. Cl.
*G01V 1/00* (2006.01)
*G06F 11/00* (2006.01)

(52) U.S. Cl. ............... 702/14; 702/11; 702/18; 702/188
(58) Field of Classification Search ............. 702/14–18, 702/121–123, 181–189
See application file for complete search history.

(56) References Cited

U.S. PATENT DOCUMENTS 4,819,214 A    4/1989    Gutowski et al. ............... 367/46
(Continued)

FOREIGN PATENT DOCUMENTS

EP    44706    1/1982
(Continued)

OTHER PUBLICATIONS

A. Bakulin and R. Calvert, "The virtual source method: Theory and case study," Geophysics vol. 71 (4) SI139-SI150 (published on-line Aug. 17, 2006).*

(Continued)

*Primary Examiner* — Phuong Huynh

(57) ABSTRACT

Method of imaging seismic data recorded using a set of seismic receivers positioned to receive seismic responses from a subsurface formation upon activating a seismic source. The seismic responses are direction-sensitive responses. A virtual signal received by receiver k from the virtual source at the position of receiver m is determined by processing involving cross correlating at least part of the responses of a receiver m with at least part of the responses of a seismic receiver k. Part of direction-sensitive responses or part of the virtual signal that contains a component of the wave field at receiver m traveling in a first direction and part of the direction-sensitive responses or part of the virtual signal that contains a component of the wave field at the receiver k traveling in a second direction may be removed.

20 Claims, 6 Drawing Sheets

U.S. PATENT DOCUMENTS

| | | | | |
|---|---|---|---|---|
| 5,067,113 | A | 11/1991 | Hanson et al. | 367/50 |
| 5,235,857 | A | 8/1993 | Anderson | 73/625 |
| 5,481,501 | A | 1/1996 | Blakeslee et al. | 367/57 |
| 5,596,548 | A | 1/1997 | Krebs | 367/56 |
| 5,742,560 | A | 4/1998 | Krebs | 367/57 |
| 6,125,330 | A | 9/2000 | Robertson et al. | 702/14 |
| 6,747,915 | B2 * | 6/2004 | Calvert | 367/46 |
| 7,046,581 | B2 | 5/2006 | Calvert | 367/57 |
| 7,706,211 | B2 * | 4/2010 | Bakulin et al. | 367/38 |
| 7,791,981 | B2 | 9/2010 | Kiyashchenko | 367/73 |
| 2002/0075363 | A1 | 6/2002 | McNeely et al. | 347/84 |
| 2003/0023449 | A1 | 1/2003 | Ibarra et al. | 705/1 |
| 2003/0023450 | A1 | 1/2003 | Casati et al. | 705/1 |
| 2005/0117452 | A1 | 6/2005 | Calvert | 367/73 |
| 2007/0195643 | A1 | 8/2007 | Bakulin et al. | 367/38 |
| 2008/0080308 | A1 | 4/2008 | Hornby | 367/15 |
| 2010/0139927 | A1 | 6/2010 | Bakulin | 166/369 |
| 2010/0268471 | A1 | 10/2010 | Kiayshchenko | 702/16 |
| 2010/0299071 | A1 | 11/2010 | Kiayshchenko | 702/16 |
| 2011/0030467 | A1 | 2/2011 | Bakulin | 73/152.32 |
| 2011/0130967 | A1 | 6/2011 | Bakulin | 702/16 |

FOREIGN PATENT DOCUMENTS

| | | |
|---|---|---|
| EP | 443234 | 8/1991 |
| WO | WO9947340 | 9/1999 |
| WO | WO0188338 | 11/2001 |
| WO | WO2004020893 | 3/2004 |
| WO | WO2005024178 | 3/2005 |
| WO | WO2008048697 | 4/2008 |
| WO | WO2008064100 | 5/2008 |
| WO | WO2009073520 | 6/2009 |
| WO | WO 2009089418 | 7/2009 |

OTHER PUBLICATIONS

A. Bakulin and R. Calvert, "Virtual shear source: a new method for shear wave seismic surveys," SEG 75th annual meeting abstract, pp. 2633-2636, Nov. 2005.*

Barr, Fred J: Dual-Sensor OBC Technology, The Leading Edge, Jan. 1997.

A. Bakulin and R. Calvert, "Virtual source: new method for imaging and 4D below complex overburden," SEG 74th annual meeting abstract, pp. 2477-2480, Oct. 2004.

R. Calvert and A. Bakulin "Improving Recovery and Insight by Improving 4-D Seismic Resolution," abstract AAPG meeting Calgary held Jun. 9, 2005.

A. Bakulin and R. Calvert, "Downhole seismic monitoring with virtual sources," abstract NG33B-0172 for AGU 2005 Fall meeting, 2005.

A. Mateeva et al., "Accurate estimation of subsalt velocities using virtual checkshots," abstract OCT 17869 for the 2006 Offshore Technology Conference.

V. Korneev and A. Bakulin, "On the Fundamentals of the Virtual Source Method," Geophysics vol. 71(3) A13-A17 (published on-line May 24, 2006).

R. Snieder et al., Equivalence of the virtual-source method and wavefield deconvolution in seismic interferometry, Phys. Rev. E vol. 73 —066620-1 to 9 (Jun. 23, 2006).

A. Bakulin and R. Calvert, "The virtual source method: Theory and case study," Geophysics vol. 71(4) SI139-SI150 (published on-line Aug. 17, 2006).

A. Bakulin et al. "Virtual shear checkshot with airguns," SEG 76th annual meeting abstract, pp. 3437-3441 Oct. 2006.

K. Mehta et al. "Virtual source gathers and attenuation of free-surface multiples using OBC data: implementation issues and a case study," SEG 76th annual meeting abstract, pp. 2669-2673a, Oct. 2006.

Rongrong Lu et al., "Image dipping sediments at a salt dome flank— VSP seismic interferometry and reverse-time migration" SEG 76th annual meeting abstract, pp. 2191-2195, Oct. 2006.

G. T. Schuster et al., "A theoretical comparison among model-based and correlation-based redatuming methods," SEG 75th annual meeting abstract, pp. 2374-2377, Nov. 2005.

C. Esmersoy, "Inversion of P and SV waves from multicomponent offset vertical seismic profiles," Geophysics vol. 55(1), pp. 39-50 (Jan. 1990).

W. Suryanto et al., "First comparison of array-derived rotation ground motions with direcdt ring laser measurements," www.geo.unipotsdam.de/mitarbeiter/Scherbaum/PDF/suryantoetal_revised.pdf, last updated Apr. 6, 2006.

* cited by examiner

METHOD OF IMAGING OF SEISMIC DATA INVOLVING A VIRTUAL SOURCE, METHODS OF PRODUCING A HYDROCARBON FLUID, AND A COMPUTER READABLE MEDIUM

PRIORITY CLAIM

The present application claims priority from PCT/US2007/084915, filed 16 Nov. 2007, which claims priority from U.S. Provisional Application 60/866,950 filed 22 Nov. 2006.

FIELD OF THE INVENTION

The present invention relates to a method of imaging seismic data recorded using at least one seismic source and a set of seismic receivers, to methods of producing a mineral hydrocarbon containing fluid from a reservoir in a subsurface formation, and to a computer readable medium storing computer-executable instructions performing the method of imaging.

BACKGROUND OF THE INVENTION

U.S. Pat. No. 6,747,915 discloses a method of seismic imaging a subsurface formation using an array of seismic sources and an array of seismic receivers located subsurface, wherein there is a complex transmission medium between the two sets. Such a complex transmission medium is for example a complex overburden. In the method of U.S. Pat. No. 6,747,915, a so-called virtual source is created at a selected receiver within the array of seismic receivers, time-reversing a portion of the signal related to the selected source and receiver, and convolving the time-reversed portion of the signal with the signal at adjoining receivers within the array. The portion of the signal that is time-reversed may be selected based on the specific geology. For instance, a time-window function may be used to select first arrivals or may be increasingly extended to include additional reverberations.

While the method as disclosed in U.S. Pat. No. 6,747,915 is very useful, application in the field has shown that resulting seismic images may contain artifacts.

It is an object of the invention to suppress one or more of such artifacts.

SUMMARY OF THE INVENTION

The present invention provides a method of imaging seismic data recorded using at least one seismic source and a set of seismic receivers j, the method comprising the steps of:
providing a set of direction-sensitive responses, obtained with the set of seismic receivers, to a wave field in the subsurface formation that was excited by activating the at least one seismic source in a location i;
determining a virtual signal received by a selected receiver k, selected from the set of seismic receivers j, from a virtual source at the location of a selected receiver m, selected from the set of seismic receivers j and which is located at a predetermined distance from the selected receiver k, by performing processing steps comprising cross correlating at least part of the response of the selected receiver m with at least part of the response of the selected receiver k;
removing part of the virtual signal that contains a component of the wave field at receiver m traveling in a first direction and removing part of the direction-sensitive responses or part of the virtual signal that contains a component of the wave field at the receiver k traveling in a second direction, the second direction being opposite to the first direction.

The present invention also provides a method of producing a mineral hydrocarbon containing fluid from a reservoir in a subsurface formation, comprising imaging seismic data recorded using at least one seismic source and a set of seismic receivers j, the imaging comprising the steps of:
(a) providing a set of direction-sensitive responses, obtained with the set of seismic receivers, to a wave field in the subsurface formation that was excited by activating the at least one seismic source in a location i;
(b) determining a virtual signal received by a selected receiver k, selected from the set of seismic receivers j, from a virtual source at the location of a selected receiver m, selected from the set of seismic receivers j and which is located at a predetermined distance from the selected receiver k, by performing processing steps comprising cross correlating at least part of the response of the selected receiver m with at least part of the response of the selected receiver k;
(c) removing part of the virtual signal that contains a component of the wave field at receiver m traveling in a first direction and removing part of the direction-sensitive responses or part of the virtual signal that contains a component of the wave field at the receiver k traveling in a second direction, the second direction being opposite to the first direction;
and the method further comprising:
identifying a reservoir in the subsurface formation based on the imaged seismic data; and
producing a mineral hydrocarbon containing fluid from the reservoir via a well that penetrates into the reservoir.

The invention also provides a method of producing a mineral hydrocarbon containing fluid from a reservoir in a subsurface formation, comprising
producing a mineral hydrocarbon containing fluid from the reservoir via a well that penetrates into the reservoir; and
monitoring the reservoir while producing the mineral hydrocarbon containing fluid, whereby the monitoring comprises:
providing a set of direction-sensitive responses, obtained with the set of seismic receivers, to a wave field in the subsurface formation that was excited by activating the at least one seismic source in a location i;
determining a virtual signal received by a selected receiver k, selected from the set of seismic receivers j, from a virtual source at the location of a selected receiver m, selected from the set of seismic receivers j and which is located at a predetermined distance from the selected receiver k, by performing processing steps comprising cross correlating at least part of the response of the selected receiver m with at least part of the response of the selected receiver k;
removing part of the virtual signal that contains a component of the wave field at receiver m traveling in a first direction and removing part of the direction-sensitive responses or part of the virtual signal that contains a component of the wave field at the receiver k traveling in a second direction, the second direction being opposite to the first direction.

In either of these methods, the part of the virtual signal that contains the component of the wave field traveling in the first direction at receiver m may be removed before cross correlating the responses by disregarding contributions from the wave field traveling in the first direction in the responses of the receiver m, or it may be removed after cross correlating.

Likewise, the part of the virtual signal that contains the component of the wave field traveling in the second direction at receiver k may be removed before cross correlating the responses by disregarding contributions from the wave field in the responses of the receiver k traveling in the second direction, or it may be removed after cross correlating.

In embodiments, the second direction may be opposite to the first direction. In other embodiments, the second direction may be in the same direction as the first direction.

The invention also provides a computer readable medium storing computer-executable instructions performing at least the following steps:
- receiving a set of direction-sensitive responses, obtained with a set of seismic receivers, to a wave field in the subsurface formation that was excited by activating at least one seismic source in a location i;
- determining a virtual signal received by a selected receiver k, selected from the set of seismic receivers j, from a virtual source at the location of a selected receiver m, selected from the set of seismic receivers j and which is located at a predetermined distance from the selected receiver k, by performing processing steps comprising cross correlating at least part of the response of the selected receiver m with at least part of the response of the selected receiver k;
- removing part of the virtual signal that contains a component of the wave field at receiver m traveling in a first direction and removing part of the direction-sensitive responses or part of the virtual signal that contains a component of the wave field at the receiver k traveling in a second direction, the second direction being opposite to the first direction.

The invention will hereinafter be further explained in more detail and by way of example, with reference to drawings.

DETAILED DESCRIPTION

Figure 1:
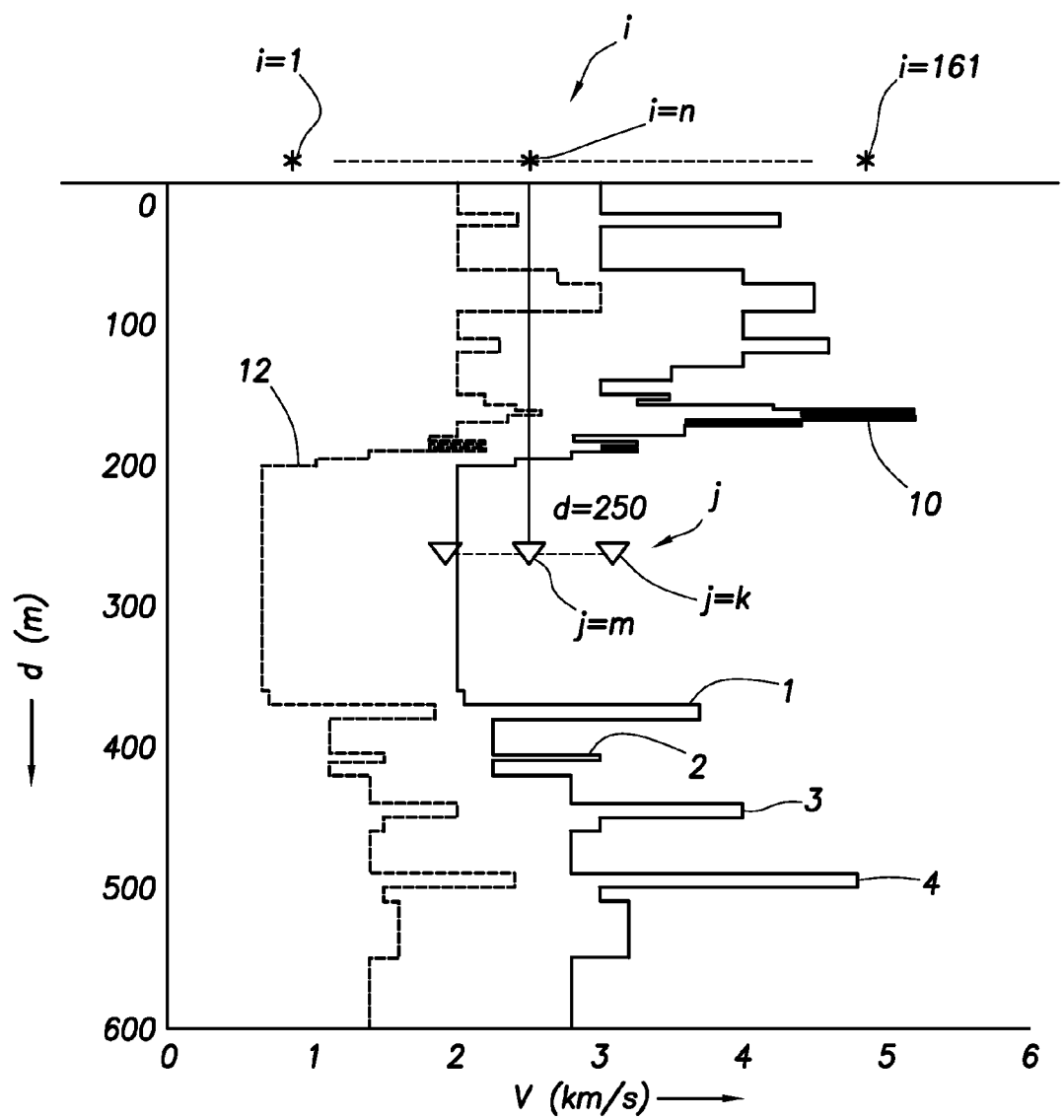
FIG. 1 schematically shows P- and S-wave velocity profiles relative to an acquisition geometry for a synthetic model.

After having recorded a wave field generated by activating a seismic source, so-called virtual source gathers may be generated by cross correlating the total wave field recorded at a virtual source location with the total wave field recorded at receivers in other locations. In 2D or 3D gathers, the cross correlated wave fields may be summed over a number of recordings wherein one or more seismic sources were activated in different locations. Summing may not be necessary in 1D gathers.

This way of generating virtual source gathers is vulnerable to inclusion artifacts in the virtual signals. One source of artifacts is related to the fact that resultant virtual source gathers include responses between the virtual source and the receiver that are not of interest.

Another source of artifacts arises from having to live with an incomplete source aperture. It is not practically possible in geophysical surveys to have sources all around the receivers so that simple cross correlating and summing over a subset of the sources does not provide the "true" virtual signal.

By selective wave field separation, involving removing part of the virtual signal that contains a component of the wave field at receiver m traveling in a first direction and/or removing part of the virtual signal that contains a component of the wave field at the receiver k traveling in a second direction, one or more of such artifacts may be suppressed.

For instance, by removing the up-going wave field at receiver m, up-going being essentially towards the average location of the set of seismic sources, the limited source aperture artifact is suppressed. The virtual source may thus be associated with a radiation pattern that sends energy more predominantly down (or towards possible target formations) as opposed a source sending energy in all direction such as would be the case using a physical source.

By removing the down-going wave field at receiver k, multiples involving reflections from overburden layers or the free surface are removed.

Doing both, only contributions to the virtual signal are considered reflecting up-going wave field at the receiver arising from the down-going wave field at the virtual source. Herewith, contributions to the virtual signal from multiple reflections from overburden and/or the free surface and from non-physical events arising due to an incomplete source aperture are reduced. Thus, the quality of the virtual signal is improved in that it more predominantly represents information on the subsurface formations below the receiver while spurious events, originating from a stationary phase contribution from non-physical arrivals between virtual source and receiver, are suppressed.

Alternatively, by removing the same-direction wave field at the receiver k as at the receiver m (which has been selected to be the location of the virtual source), the virtual signal becomes suitable for virtual source check shot. For instance, in the case that the up-going wave field is removed at receiver m, the up-going wave field could also be removed at the receiver k.

In addition to, or instead of, any of these wave field separation strategies set forth above, the wave fields at the virtual source or at the receivers may be separated into wave field types characterized by compressional P-wave components and shear S-wave components. The separation into P-wave and S-wave components have four flavors: removing P-wave from the wave field at the receiver m and removing P-wave from the wave field at the receiver k; removing P-wave from the wave field at the receiver m and removing S-wave from the wave field at the receiver k; removing S-wave from the wave field at the receiver m and removing P-wave from the wave field at the receiver k; and removing S-wave from the wave field at the receiver m and removing S-wave from the wave field at the receiver k.

A combination of directional wave field separation and wave-field type separation may for instance involve removing P-waves in a first direction and S-waves in both first and second directions at the receiver m and removing P-waves in the second direction and S-wave in both first and second directions at the receiver k in order to obtain a P-P section. Likewise, an S-S section may be obtained involving removing S-waves in a first direction and P-waves in both first and second directions at the receiver m and removing S-waves in the second direction and P-wave in both first and second directions at the receiver k.

Any of the forms of wave field separation or combination of wave field separations set forth above may be combined with time-gating of the response at the receiver m, which has been selected to be the location of the virtual source. In embodiments, the time gating may be selected in the form of a time window around the direct arrivals at the location of the virtual source, to enhance the contribution of direct arrivals in the virtual gather. Such a time window is also believed to help to remove shear-wave energy from the virtual source and thereby improve the signal to noise ratio. In other embodiments, the time gating may be selected such as to base the virtual source on late time arrivals. This enhances the contribution of shear-wave energy in the virtual source, thus helping to generate a virtual shear source.

The method may further comprise repeating the steps for individual coordinate components of the recorded responses and obtaining a final response as a superposition of one or more responses obtained with the individual coordinate components. With the term "coordinate components of these recorded responses" is meant the individual coordinate components of the recorded displacements in the formation, which are to be distinguished from the above mentioned directions of the wave field. Typically, three orthogonal X, Y and Z, or possibly three or more non-orthogonal components may be employed.

A seismic image of an earth formation may be obtained using at least one seismic source and at least one seismic receiver. The source generates a seismic wave into the earth formation, in which formation the seismic wave is reflected by acoustic-impedance contrasts and refracted through media having a variable velocity. The reflected wave is received by the seismic receiver(s). A receiver detects the reflected wave and records it in the form of a signal or seismic trace. The receivers record one signal per receiver and the signals or traces are compiled to yield the seismic image of the underground formation.

Seismic images may be obtained with seismic sources and seismic receivers that are located at or above surface and/or in boreholes, both vertical and in horizontal boreholes.

Those skilled in the art will appreciate that the methods disclosed herein may be practiced with various computer system configurations, including hand-held devices, multi-processor systems, microprocessor-based or programmable consumer electronics, minicomputers, mainframe computers, and the like. The methods may also be practiced in distributed computing environments where tasks are performed by remote processing devices that are linked through a communications network. In a distributed computing environment, program modules may be located in both local and remote computer storage media including memory storage devices.

The instructions for imaging the seismic data, as set forth above, may be provided in the form of a computer readable medium storing such instructions. By way of example, and not limitation, computer readable media may comprise computer storage media and communication media. Computer storage media may include volatile and/or nonvolatile memory forms such as a read only memory (ROM) and random access memory (RAM). Volatile/nonvolatile computer storage media may be either removable or non-removable. For example only, a hard disk drive may read from or write to non-removable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used include, but are not limited to, magnetic tape cassettes, flash memory cards, digital versatile disks, digital video tape, solid state RAM, solid state ROM, and the like.

Synthetic Examples

To illustrate the usefulness of the concepts outlined above, a synthetic model is presented based on FIG. 1. FIG. 1 schematically shows P- and S-wave velocity (V) profiles as a function of depth (d), respectively shown by lines 10 and 12, relative to an acquisition geometry for the synthetic model. The acquisition geometry includes a set of seismic sources i at depth 0, and a set of seismic receivers j placed in a horizontal well at a depth of d=250 m. Depth zero may correspond to the surface of a formation, such as a land surface or a land bed below a body of water.

For the present simulations, the set of seismic sources i consists of 161 sources numbered 1 to 161 and spaced 10 m apart to cover 1600 m. The set of seismic receivers j consist of 41 seismic receivers spaced 10 m apart to cover 400 m in the horizontal direction. This geometry is however not a requirement of the invention. Other numbers of seismic sources and/or seismic receivers may be employed, and the seismic sources and/or seismic receivers may be located at other depths and they do not have to be arranged in a horizontal configuration.

The density of the subsurface formation varies between 2.1 to 2.5 g/cm$^3$, but this is not a requirement for the invention either.

Synthetic simulations will be produced hereinafter employing reflectivity modeling as proposed by Schmidt and Tango in 1986, and published in an article entitled "Efficient global matrix approach to the computation of synthetic seismograms" in Geophysical Journal of the Royal Astronomical Society, Vol. 84, pages 331-359, incorporated herein by reference. The objective is to create virtual sources along the horizontal well to eliminate the distorting effects of the upper near surface, when trying to image the reservoir layers below the set of seismic receivers.

In certain regions of the world, including Middle East, this upper near surface may form a complex overburden consisting of layers with extremely high velocity contrasts such as shown in FIG. 1. In other regions, the upper near surface layers may comprise salt domes, which traditionally have created problems in seismic studies.

Figure 2:
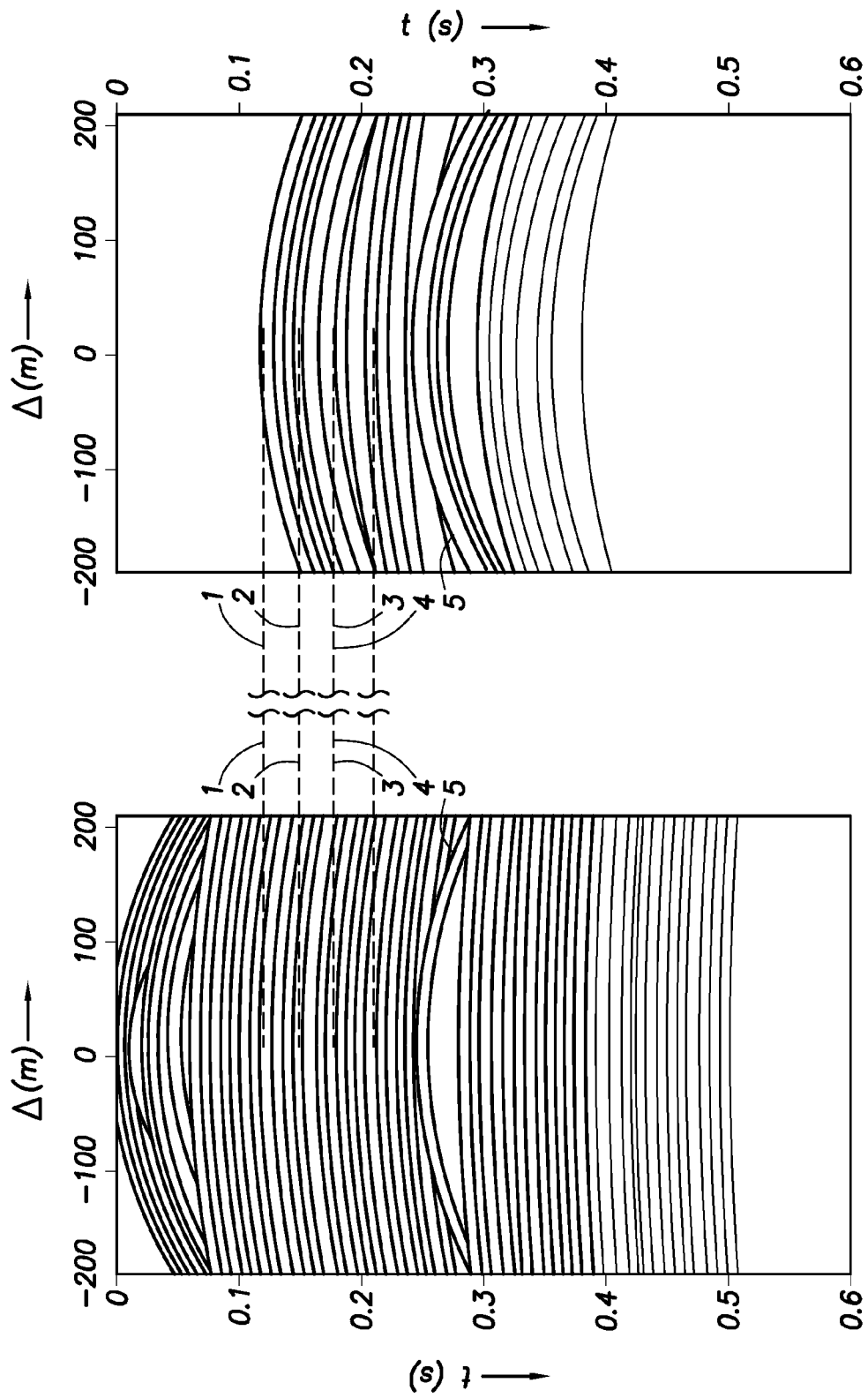
FIG. 2a shows full wave field gather calculated using the velocity profiles and acquisition geometry as shown in FIG. 1 having selected seismic receiver m as the location of the virtual source.
FIG. 2b shows a comparative "ground-truth" gather calculated after removing laterally propagating shear waves, under an assumption that at the location of seismic receiver m a real seismic source is fired and that the half space above the real seismic source is homogeneous.

FIG. 2a shows a calculated virtual source gather for the geometry as set forth with reference to FIG. 1, comprising virtual signals generated by cross-correlating the total wave field at the virtual source located at selected seismic receiver j=m=21, i.e. the middle receiver, with the total wave field of the other receivers j=1 to 20 and 22 to 41. Also included is a virtual signal generated by auto-correlating the total wave field at receiver j=21, which represents Δ=0.

For comparison, FIG. 2b shows the wave field recorded by each of the seismic receivers j=k assuming that a physical source (vertical force) was activated at the location of seismic receiver j=m=21, calculated after removing laterally propagating shear waves, under an assumption and that the half space above the real seismic source is homogeneous. FIG. 2b predominantly shows four P-P reflection events labeled 1 to 4, corresponding to 1 to 4 in FIG. 1, in addition to a P to S conversion labeled 5. These are also present in the virtual source gather of FIG. 2a, together with lots of other events. The other events may be of physical nature, including overburden-related responses, or of unphysical nature, including artifacts due to limited source aperture. However, for some geophysical application these other events, whether of physical or non-physical origin, may represent unwanted responses.

Figure 3:
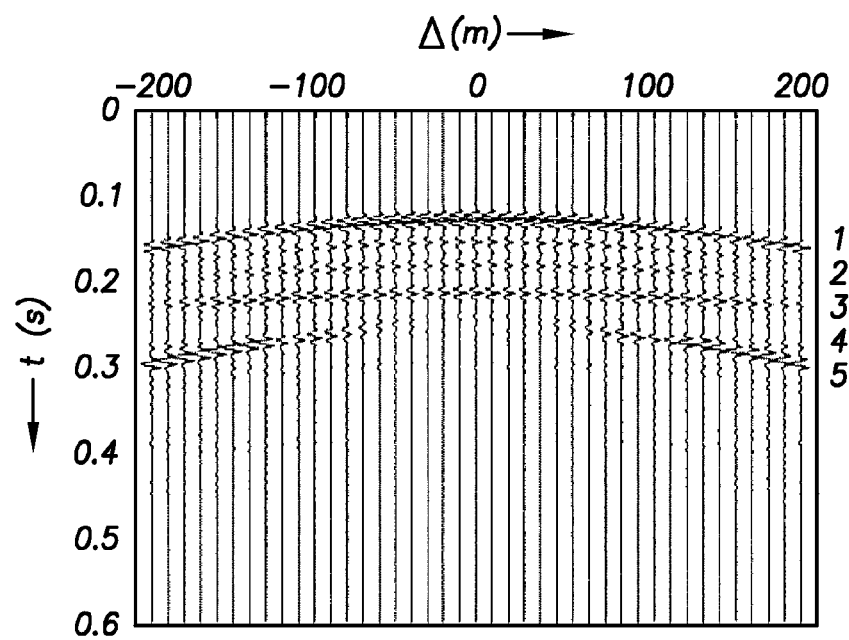
FIG. 3 shows the same data as FIG. 2b plotted as a collection of individual responses at each receiver j.

The wave field shown in FIG. 2b represents for the purpose of the present specification a "ground-truth" gather. For easier comparison, the "ground-truth" gather is shown in FIG. 3, as well, together with the labels 1 to 5 identified above.

Figure 4:
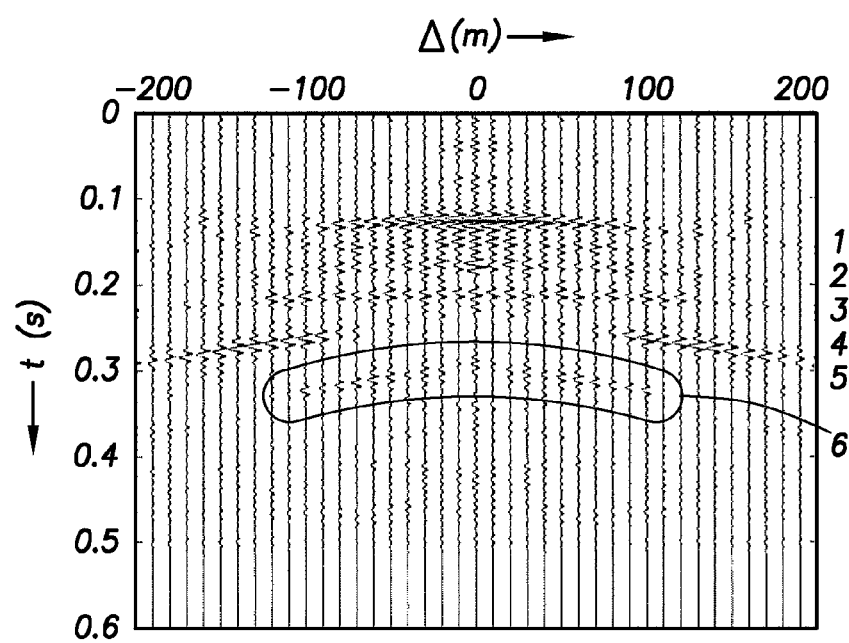
FIG. 4 shows a virtual source gather generated by cross-correlating down-going waves at the virtual source with up-going waves at the receivers.

FIG. 4 shows a virtual source gather, plotted as two-way travel time t against receiver offset Δ, comprising virtual signals generated by cross-correlating the down-going waves at receiver m=21, corresponding to the selected location of the virtual source, with the up-going waves at the seismic receivers k=1 to 20 and 22 to 41. In this case, up-going and down-going are defined as towards, respectively away from, the set of seismic sources i. Also included is a virtual signal generated by auto-correlating the total wave field at receiver j=21, which is shown at offset Δ=0. Various spurious events are suppressed and the virtual source gather is surprisingly close to the "ground-truth" response shown in FIG. 3. Hence, wave field separation offers a useful tool for generation the imaging the seismic data and generating a virtual source gather that focuses on true subsurface responses.

Figure 5:
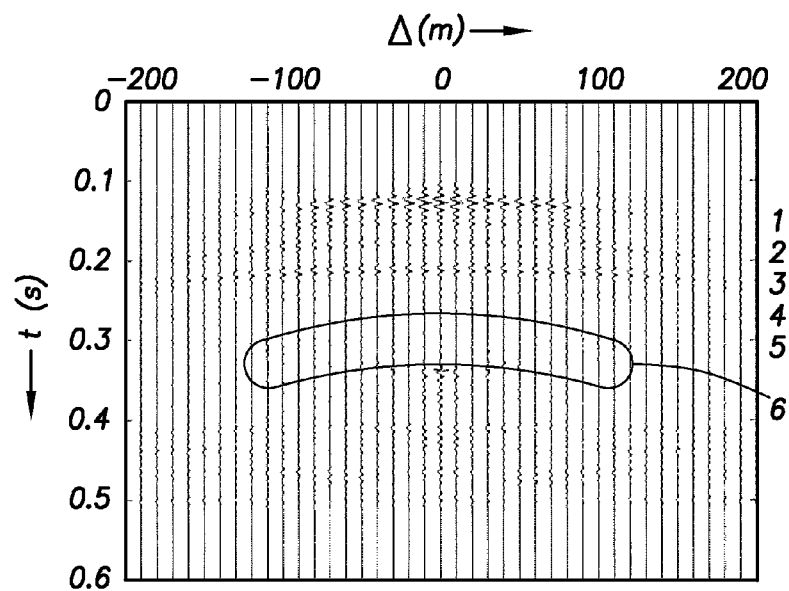
FIG. 5 shows the virtual source gather of FIG. 4 wherein, in addition, the waves at the virtual source have been time-gated.

FIG. 5 shows a virtual source gather, plotted as two-way travel time t against receiver offset A, wherein the wave field separation of FIG. 4 has been combined with time-windowing or time-gating of the responses of the receiver m=21 before correlating with at least part of the responses of the other receivers k to obtain the respective virtual signals. This virtual source gather has been generated by correlating the direct arrival windowed in the down-going waves at the virtual source location with the up-going waves at the receivers k. The selected time window filters out the P to S conversion responses at 5. The improvement over applying exclusively wave field separation is most pronounced in the overburden events, but also the event labeled 6 is further suppressed.

Field Example

On physical data acquired in a real subsurface formation, wave field separation of the recorded wave fields in up- and down-going parts may be done in various ways. One way that will be discussed here employs the summing dual sensor responses using a hydrophone and a geophone in the form of a vertical-component geophone recording at substantially the same receiver location. The sum of the hydrophone response and the geophone response is representative of the up-going energy whereas the difference is representative of the down-going energy. Further details on this technique may be found in, for instance, an article published in The Leading Edge, January 1997, titled "Dual-sensor OBC technology" by Fred J. Barr, which is incorporated herein by reference. Despite this technique strictly being valid for zero-offset data in layered media only, the present authors have found that dual-sensor summing techniques also provide sufficiently satisfactory separation of the wave field into up- and down-going waves at all offsets at hand.

Direction-sensitive responses have been acquired in an off-shore formation, using a set of seismic sources in the form of 405 air guns spaced every 25 m on the sea surface and a set of seismic receivers in the form of 120 four-component sensors spaced every 50 m permanently placed on the sea floor at one kilometer depth.

Figures 6A, 6B:
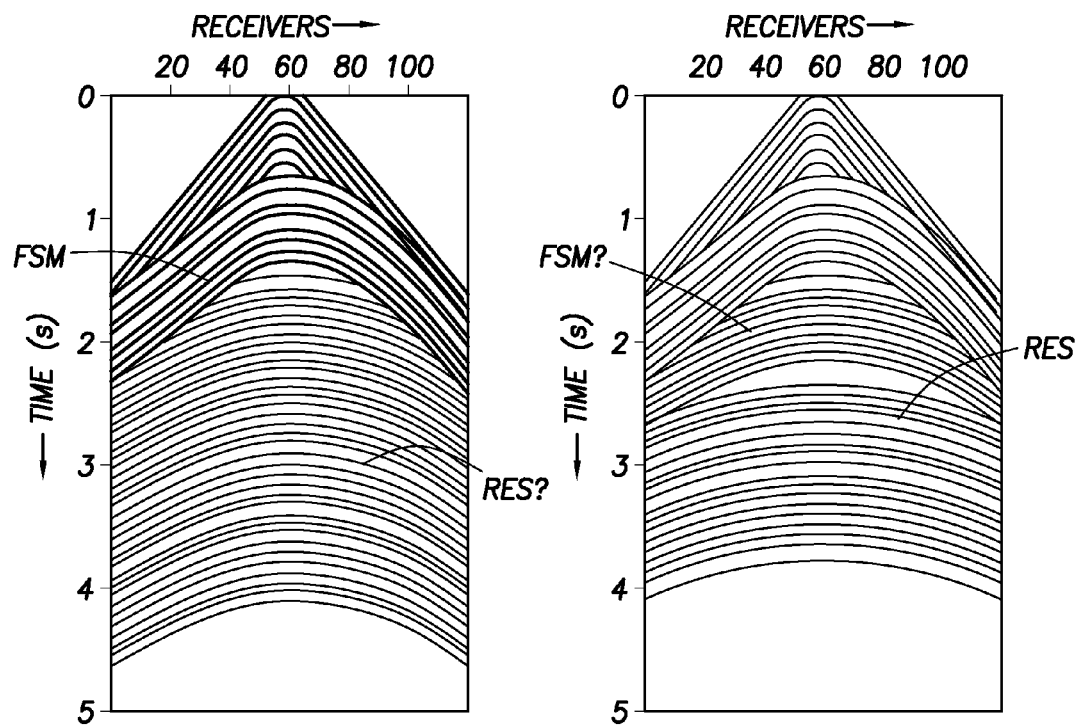
FIG. 6a shows a full wave field virtual source gather imaged from ocean-bottom cable data employing air guns at sea level and seismic receivers located on the sea floor.
FIG. 6b shows the virtual source gather of FIG. 6a after removing the up-going waves at the virtual source and removing the down-going waves at the receivers before cross correlating the responses.

Receiver 60, which is the middle receiver, is selected as the location of the virtual source, and the correlation gathers have been summed over all the physical air gun sources. The dual-sensor summation technique is employed for the separation of the wave filed into up- and down-going waves. FIG. 6a shows the virtual source gather, for the hydrophone component, generated by cross correlating the total wave field recorded at the virtual source location with the total wave field at the receivers. The gather is plotted against receiver number. The most prominent reflection, labeled as FSM in the figure, is identified as the reflection from the sea surface. The location labeled as res? marks the location where the strongest true reflection from the subsurface formation is expected to occur in this particular experiment. FIG. 6a thus shows that the virtual source gather based on total wave fields is dominated by the reflection from the sea surface.

FIG. 6b shows the corresponding virtual source gather generated by cross-correlating the down-going waves at the virtual source location with the up-going waves at the receivers. The separation of the wave fields has been done by using the hydrophone and vertical component geophone recordings together with the dual-sensor summation technique. The location labeled FSM? marks the free-surface multiple reflection, which is almost gone. The reflections from the deeper subsurface, including the strongest true reflection from the subsurface labeled res, are now visible.

Figure 6D:
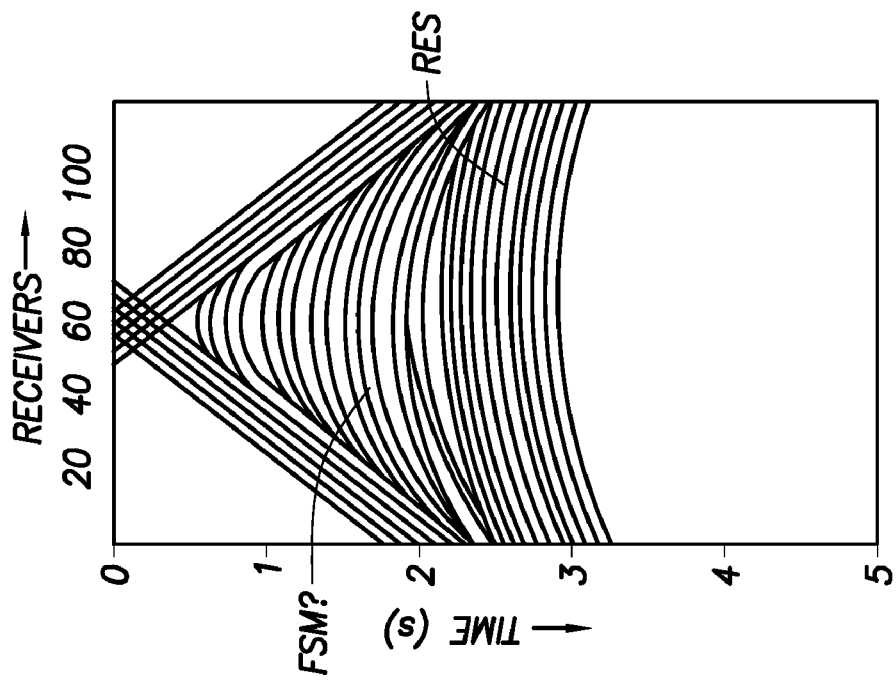
FIG. 6d shows the virtual source gather of FIG. 6b, whereby the response at the virtual source has also been time gated.
Figure 6C:
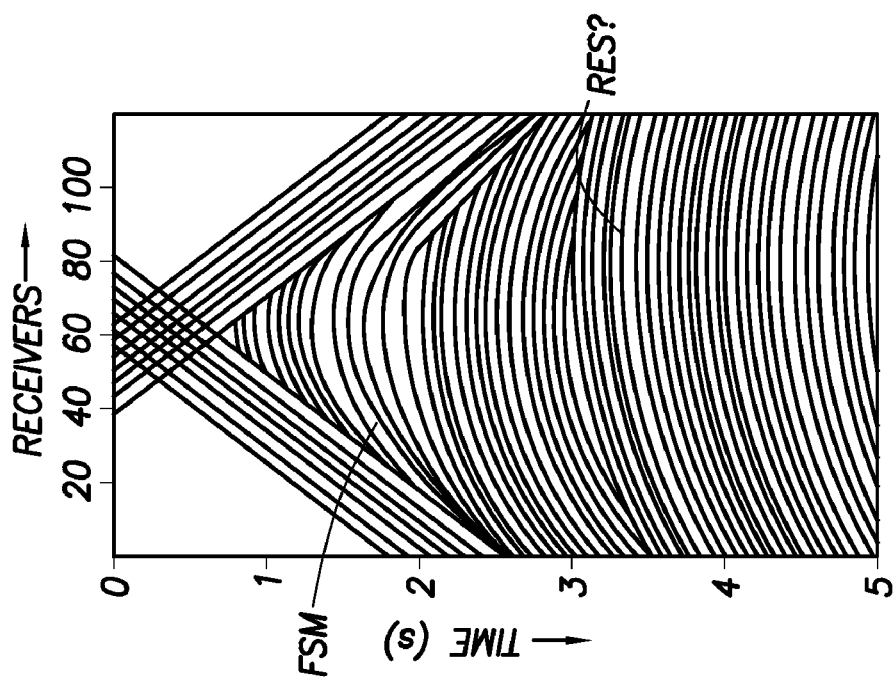
FIG. 6c shows the virtual source gather of FIG. 6a, whereby the response at the virtual source has been time gated.

FIG. 6c shows the virtual source gather obtained by cross correlating time-gated direct arrivals in the total wave field at receiver 60, which is selected to be the location of the virtual source, with the total wave fields at the receivers. The time gating was set at a time window of 400 ms around the direct arrival time. Correlating the thus time-windowed direct arrivals makes the virtual source gather cleaner, as can be seen by comparing FIG. 6c with FIG. 6a, but the strongest reflection is still the free-surface multiple as indicated by FSM.

FIG. 6d shows the virtual source gather obtained by cross correlating time-gated direct arrivals in the down-going wave field at receiver 60, which is selected to be the location of the virtual source, with the up-going wave fields at the receivers. The time gating was against set at a time window of 400 ms around the direct arrival time. The true subsurface response, labeled res, is clearly visible in absence of the free-surface multiples and with strongly reduced noise compared to FIG. 6b.

In particular when employed for time-lapse monitoring of the subsurface formation, the sea level, water velocity and shot locations may change slightly between repeat acquisitions even though the receivers may remain fixed on the sea bed. This traditionally caused problems for seismic monitoring, which is typically aimed to detect small time shifts and amplitude changes related to reservoir depletion. The present method allows to redatum seismic data to the seabed without requiring knowledge on all these factors, because redatumed data corresponds to fixed virtual source locations and fixed receiver locations.

The same is true relative to changes in the overburden, when the time lapse monitoring employs receivers fixed in a borehole in a subsurface formation.

As stated above, the dual sensor summation technique is strictly speaking valid for zero-offset data over layered media. In cases where this technique fails to deliver separated wave fields with undistorted phase, as preferred for generating virtual source signals, an alternative approach may be applied to unravel reflection responses. Typically, this may be preferred when considering very large offsets and/or complex (2D and 3D) overburden structures.

Figure 7:
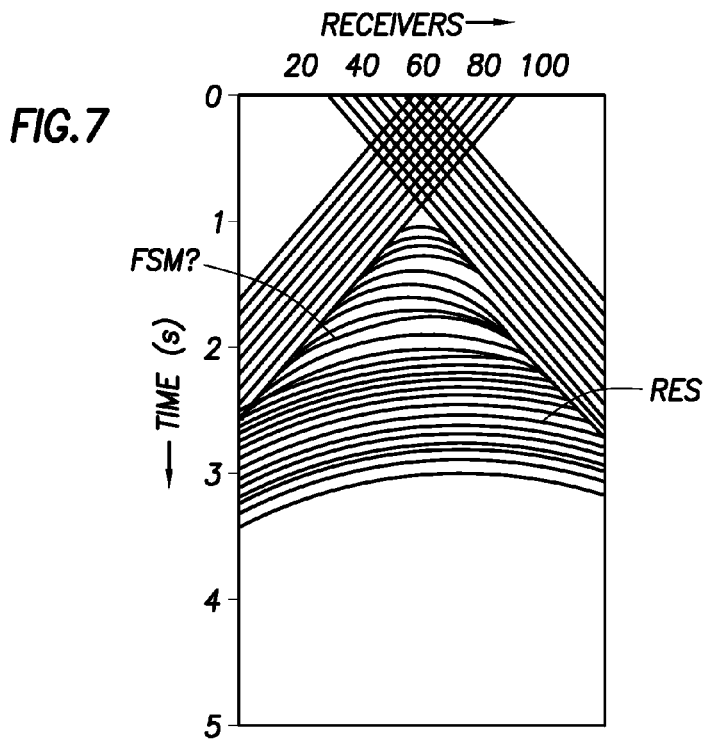
FIG. 7 shows a virtual source gather obtained by removing wave field components after cross-correlating responses.

One such alternative approach may comprise generating two virtual source data sets, by cross correlating parts of the responses and summing over a number of different source activations at different offsets, using a hydrophone and an at least single-component geophone (directed along first or second direction) separately, and then extracting the waves traveling in the second direction for a down-hole survey using dual sensor summation. The virtual source gather shown in FIG. 7 has been generated in this way, by summing the virtual source gathers generated for hydrophone and vertical-component geophone, each of which was generated separately by cross-correlating a direct arrival time-window in the total wave field at the virtual source location with the total wave field at the receivers. The gather of FIG. 7 is very similar in quality as the gather shown in FIG. 6d. Differences between these two gathers, such as some distortions at early times, may be explained by having time-windowed the total wave field instead of the down-going waves.

The wave field separation after cross correlating may be further improved by suitable combination of 3-component sources and 4-component geophones.

For separating shear waves, purely rotational sensor has recently been demonstrated. Reference is made to paper S33B-0316 of the Fall Meeting of the American Geophysical Society, by U. Schreiber et al, titled "The GEOsensor: a measurement device for earth quake induced rotational ground motions", incorporated herein by reference. A miniature version of such sensor may be provided to fit into a borehole or on an ocean-bottom cable (OBC).

Application to Production of Mineral Hydrocarbon Containing Fluids

The virtual source method employing wave field separation as set forth above provides a valuable tool to explore subsurface formations for the presence of reservoirs containing hydrocarbon containing fluids and to monitor such reservoirs during production of hydrocarbon fluids. One example of particular value is where the transmission medium between the physical seismic sources and the seismic receivers has changed between repeat measurements in time-lapse seismic surveys, because the virtual source method is in essence independent of the transmission medium Such exploration may include identifying a reservoir in the subsurface formation based on the imaged seismic data. After having identified the reservoir, a mineral hydrocarbon containing fluid may be produced from the reservoir via a well that penetrates into the reservoir.

Once the reservoir has been identified, providing a well that penetrates into the reservoir is assumed to involve technology commonly known to the person of ordinary skill in the art.

Mathematical Background

The concept of cross-correlating at least part of the responses of the receiver m with at least part of the responses of the other receiver k to obtain a virtual signal will be explained here with reference to FIG. 8.

Figure 8:
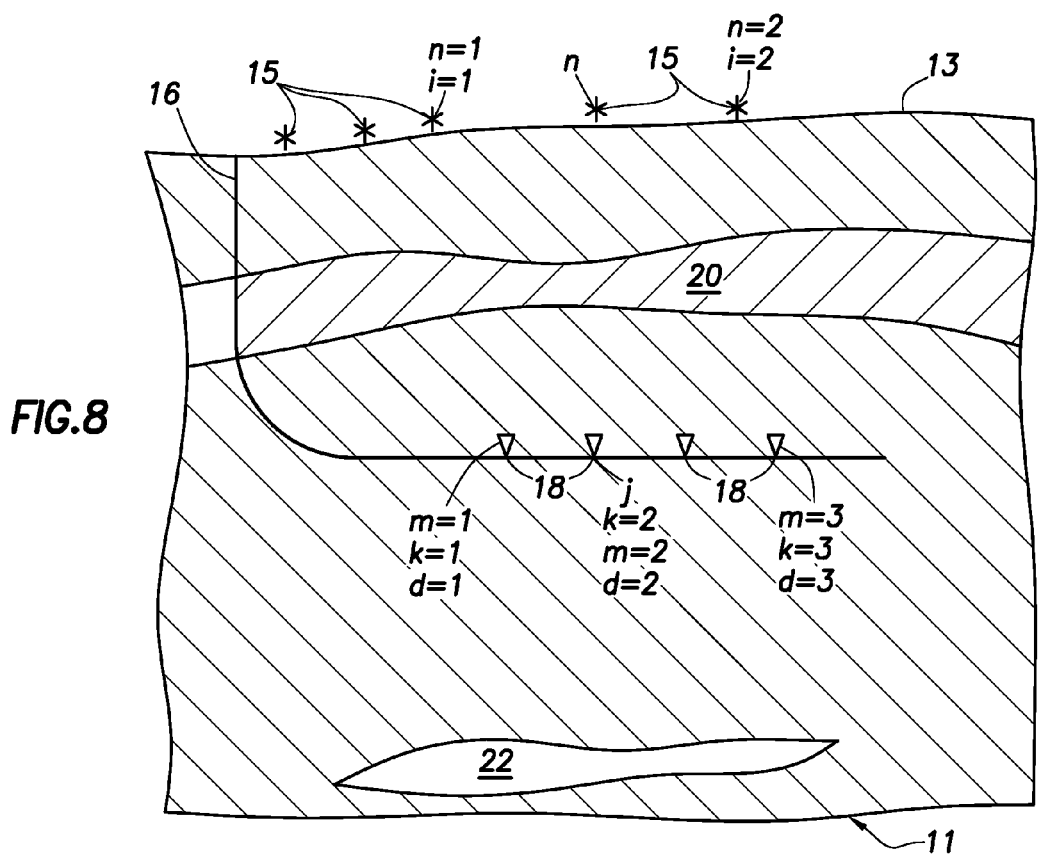
FIG. 8 schematically and not to scale, shows an arrangement of seismic sources and seismic receivers suitable carrying out embodiments of the method of the present invention.

FIG. 8 shows schematically and not to scale a section 11 of the earth having a surface 13. At the surface 13 are located seismic sources 15, and in a borehole 16 are located seismic receivers 18. The part of the borehole 16 in which the seismic receivers 18 are located lies under a complex transmission medium, here in the form of complex overburden 20. Deeper in the section 11 of the earth, below the complex overburden 20, a target area 22 is located of which a seismic image is to be made.

It will be understood that FIG. 8 is presented by way of example only. For instance, it is not of essence to have the seismic receivers located in a borehole. Instead, they may be located in a tunnel, an underground mine, or even below a body of water, for instance, when the measurements are made in a marine environment.

With a set of the seismic receivers 18, the signals obtained from activating a set of the seismic sources 15 is recorded. It will be understood that the seismic wave that is emitted by a seismic source 15 and received by a seismic receiver 18 generates a signal varying with time, which signal consists of a part that comes from the seismic wave that passes through the complex overburden 20 towards the receiver 18 and a part that comes from waves that travel all the way down to the target area 22 and that are reflected back to the seismic receiver 18. The first part of the signal is called the direct part of the signal. The latter part of the signal contains valuable target information.

In the formulae that will be used, the signals can be referred using the symbol $u_{15i,18j}(t)$, wherein $15i$ refers to a seismic source 15 and $18j$ to a seismic receiver 18; however, for the sake of clarity we will remove the '15' and the '18 ' from the symbol. Thus, the signals are identified as $u_{ij}(t)$, wherein i refers to a seismic source and j to a seismic receiver.

One seismic receiver, 18m, is selected as the location of the virtual source. The signals $u_{ij}(t)$ will be transformed such that a virtual signal is obtained that originates from waves traveling from the virtual source positioned at receiver 18.

Then a seismic source 15n is selected from the seismic sources 15i. From the signals $u_{ij}(t)$ the signal $u_{nm}(t)$ is selected and at least a part of the signal $u_{nm}(t)$ is time-reversed to obtain time-reversed signal $u_{nm}(-t)$. Time reversal is just trace reflection about time zero, thus a trace from time 0 to time t becomes from time 0 to time −t. An example of the part of the signal that is time-reversed is the signal due to the direct wave, which is that part of the signal that is received with receiver 18m that comes from the seismic wave directly traveling from the source 15n towards the receiver 18m through the complex overburden 20.

The virtual source is assumed to be at the position of the seismic receiver 18m, and it is an object to obtain from the signals from the sources 15n a signal that originates from the virtual source 18m and is received at a receiver 18k.

Having selected the seismic receiver 18k, wherein k is in a predetermined range around the position of seismic receiver 18m, the time-reversed signal $u_{nm}(-t)$ is convolved with the signal $t_{nk}(t)$ to obtain the convolved signal $u^{conv}_{nmnk}(t)=u_{nm}(-t) \otimes u_{nk}(t)$. Convolution of a time-reversed signal with another signal is mathematically equivalent to cross correlating these two signals without time-reversal.

The symbol ⊗ means convolution.

In order to get the convolved signals for the seismic sources n, a next source n is selected, and the above steps, which result in the convolved signal, are repeated. Then the convolved signals are summed over the seismic sources n to obtain a signal $u^{vs}_{mk}(t)=\Sigma_n u^{conv}_{nmnk}(t)$. The signal $u^{vs}_{mk}(t)$ is the signal received by a receiver at the position k from a virtual source at the position of receiver m. This signal is substantially free from distortions that originate from the direct wave traveling through the complex overburden 20.

In order to obtain a seismic image the above steps are repeated over k to get the signals $u^{vs}_{mk}(t)$ received at a set of seismic receivers 18k from the virtual seismic source 18m, and then the steps are repeated over m to obtain the complete seismic image.

Examples of the above-described steps are provided in U.S. Pat. No. 6,747,915, incorporated herein by reference.

Summarizing: a seismic image of the subsurface formation may be made using a set of seismic sources i and a set of seismic receivers j, wherein there is a complex transmission medium between the two sets, which method comprises the steps of:

(a) recording with the set of seismic receivers j the signals $u_{ij}(t)$ obtained from activating the set of seismic sources i;

(b) selecting a seismic receiver m as the location of a virtual source;

(c) selecting a seismic receiver k, wherein k is in a predetermined range around the position of seismic receiver m;

(d) selecting a seismic source n from the seismic sources i;

(e) time-reversing at least a part of the signal $u_{nm}(t)$ to obtain a time-reversed signal $u_{nm}(-t)$;

(f) convolving the time-reversed signal $u_{nm}(-t)$ with the signal $u_{nk}(t)$ to obtain the convolved signal $u^{conv}_{nmnk}(t) = u_{nm}(-t) \otimes u_{nk}(t)$;

(g) selecting a next source n, repeating steps (e) and (f) until a predetermined number of sources have had their turn;

(h) summing the convolved signals over the seismic sources n to obtain a signal $u^{vs}_{mk}(t) = \Sigma_n u^{conv}_{nmnk}(t)$, where $u^{vs}_{mk}(t)$ is the signal received by a receiver at the position k from a virtual source at the position of receiver m;

(i) repeating steps (c) through (h) over k;

(j) repeating steps (b) through (i) over m to generate a seismic survey with virtual sources m and receivers k; and (k) further processing the virtual source signals to obtain a seismic image.

As stated before, the time-reversed signal may be gated by selecting a time-window, for instance around the first arrivals or around converted S-wave arrivals.

Suitably, the time-reversed signal $u_{nm}(-t)$ may be weighted to control the radiation pattern of the virtual source.

Suitably the recorded signals $u_{ij}(t)$ may be pre-processed to separate the contributions from up- and down-going waves. Preferred wave field separations have been disclosed above.

Processing the time reversed signal $u_{nm}(-t)$ may further include spectral phase and amplitude adjusting the time-reversed signal to provide desired wavelet shaping.

What is claimed is:

1. A method of imaging seismic data recorded using at least one seismic source and a set of seismic receivers j, the method comprising the steps of:

(a) providing a set of direction-sensitive responses, obtained with the set of seismic receivers, to a wave field in the subsurface formation that was excited by activating the at least one seismic source in a location i;

(b) determining a virtual signal received by a selected receiver k, selected from the set of seismic receivers j, from a virtual source at the location of a selected receiver m, selected from the set of seismic receivers j and which is located at a predetermined distance from the selected receiver k, by performing processing steps comprising cross correlating at least part of the response of the selected receiver m with at least part of the response of the selected receiver k, wherein said cross-correlation is performed on a processor;

(c) removing part of the virtual signal that contains a component of the wave field at receiver m traveling in a first direction and removing part of the direction-sensitive responses or part of the virtual signal that contains a component of the wave field at the receiver k traveling in a second direction, the second direction being opposite to the first direction; and (d) using the data remaining after step (c) to generate a seismic image of the subsurface formation.

2. The method of claim 1, wherein in step (a) a plurality of sets of direction-sensitive responses, obtained with the set of seismic receivers, is provided for a plurality of different locations i; and wherein in step (b) the processing steps further comprise determining cross correlated signals for each of the plurality of locations i, by cross correlating at least part of the response of the selected receiver m with at least part of the response of the selected receiver k, each associated with activating the seismic source at a selected location i, and summing the cross correlated signals over two or more of the plurality of locations i.

3. The method of claim 1, wherein the component of the wave field at receiver m traveling in the first direction is an up-going component and the component of the wave field at the receiver k traveling in the second direction is a downgoing component, relative to the seismic source.

4. The method of claim 1, wherein the part of the virtual signal that contains the component of the wave field at receiver m traveling in the first direction is removed.

5. The method of claim 1, wherein the part of the virtual signal that contains the component of the wave field at receiver k traveling in the second direction is removed.

6. The method of claim 1, further comprising a step of removing part of the virtual signal that contains a P-wave component of the wave field traveling in the first direction at receiver m.

7. The method of claim 6, further comprising a step of removing part of the virtual signal that contains a P-wave component of the wave field traveling in the second direction at the receiver k.

8. The method of claim 6, further comprising a step of removing part of the virtual signal that contains an S-wave component.

9. The method of claim 1, further comprising a step of removing part of the virtual signal that contains an S-wave component of the wave field traveling in the first direction at receiver m.

10. The method of claim 9, further comprising a step of removing part of the virtual signal that contains a P-wave component of the wave field.

11. The method of claim 10, further comprising a step of removing part of the virtual signal that contains an S-wave component of the wave field traveling in the second direction at the receiver k.

12. The method of claim 1, further comprising time-gating the responses of the receiver m before correlating with at least part of the responses of the receiver k to obtain the virtual signal.

13. The method of claim 1, further comprising weighting the responses of the receiver m before correlating with at least part of the responses of the receiver k to obtain the virtual signal.

14. The method of claim 1, further comprising repeating the steps for other seismic receivers k relative to the selected seismic receiver m.

15. The method of claim 1 or, further comprising varying the location of the virtual source by repeating the steps whereby another seismic receiver m is selected of the from the set of seismic receivers j.

16. The method of claim 15, comprising further processing the virtual source signals to obtain a seismic image of at least part of the subsurface formation.

17. The method of claim 1, wherein removing part of the virtual signal comprises summing dual sensor responses using a hydrophone and a geophone sensing at least a component along the first or the second direction.

18. The method of claim 1 or, comprising time-lapse monitoring of the subsurface formation by repeating the steps and monitoring differences in the virtual signal over time.

19. The method of claim 1 or, further comprising repeating the steps for individual coordinate components of the recorded responses and obtaining a final response being a superposition of one or more of the recorded responses as obtained with the individual coordinate components.

20. A method of producing a mineral hydrocarbon containing fluid from a reservoir in a subsurface formation, comprising imaging seismic data recorded using at least one seismic source and a set of seismic receivers j, the imaging comprising (a) providing a set of direction-sensitive responses, obtained with the set of seismic receivers, to a wave field in the subsurface formation that was excited by activating the at least one seismic source in a location i;

(b) determining a virtual signal received by a selected receiver k, selected from the set of seismic receivers j, from a virtual source at the location of a selected receiver m, selected from the set of seismic receivers j and which is located at a predetermined distance from the selected receiver k, by performing processing steps comprising cross correlating at least part of the response of the selected receiver m with at least part of the response of the selected receiver k; and (c) removing part of the virtual signal that contains a component of the wave field at receiver m traveling in a first direction and removing part of the directionsensitive responses or part of the virtual signal that contains a component of the wave field at the receiver k traveling in a second direction, the second direction being opposite to the first direction;

(d) identifying a reservoir in the subsurface formation based on the imaged seismic data; and (e) producing a mineral hydrocarbon containing fluid from the reservoir via a well that penetrates into the reservoir.

* * * * *